United States Patent [19]

Gerber

[11] Patent Number: 5,218,010
[45] Date of Patent: Jun. 8, 1993

[54] ACCELERATORS FOR REFRACTORY MAGNESIA

[75] Inventor: Arthur H. Gerber, Louisville, Ky.

[73] Assignee: Borden, Inc., Columbus, Ohio

[21] Appl. No.: 943,046

[22] Filed: Sep. 10, 1992

Related U.S. Application Data

[60] Division of Ser. No. 803,979, Dec. 9, 1991, Pat. No. 5,182,347, which is a continuation-in-part of Ser. No. 616,879, Nov. 12, 1990, Pat. No. 5,182,346, which is a continuation-in-part of Ser. No. 562,206, Aug. 2, 1990, Pat. No. 5,096,983.

[51] Int. Cl.$^5$ ............................................. B22C 1/22
[52] U.S. Cl. ....................................... 523/145; 523/146; 523/147; 525/480; 525/504; 525/508; 528/129; 524/594; 524/596
[58] Field of Search ............................ 523/145, 146, 147; 525/480, 504, 508; 524/594, 596; 528/129

[56] References Cited

U.S. PATENT DOCUMENTS

| Re. 32,720 | 7/1988 | Lemon et al. | 523/145 |
|---|---|---|---|
| RE. 32,812 | 12/1988 | Lemon et al. | 523/145 |
| 2,424,787 | 7/1947 | Adams | 260/38 |
| 2,712,533 | 7/1955 | Mitchell | 260/25 |
| 2,869,191 | 1/1959 | Cooper et al. | 22/147 |
| 2,869,194 | 1/1959 | Cooper | 22/193 |
| 2,869,196 | 1/1959 | Cooper | 22/193 |
| 2,913,787 | 11/1959 | Cooper | 22/193 |
| 3,666,703 | 5/1972 | Murata | 260/29.3 |
| 4,282,288 | 8/1981 | Yoshino et al. | 428/408 |
| 4,473,654 | 9/1984 | Stendera | 501/108 |
| 4,487,868 | 12/1984 | Armbruster et al. | 524/74 |
| 4,539,343 | 9/1985 | Nishimura | 523/145 |
| 4,668,759 | 5/1987 | Iyer et al. | 528/139 |
| 4,740,535 | 4/1988 | Iyer et al. | 523/145 |
| 4,758,478 | 7/1988 | Daisy et al. | 428/529 |
| 4,794,051 | 12/1988 | Gupta | 428/524 |
| 4,831,067 | 5/1989 | Lemon et al. | 523/156 |
| 4,848,443 | 7/1989 | Westwood et al. | 164/527 |
| 4,939,188 | 7/1990 | Gerber | 523/146 |
| 4,961,745 | 10/1990 | Detlefsensd | 156/62.6 |
| 4,964,917 | 10/1990 | Bobrowski et al. | 106/804 |

FOREIGN PATENT DOCUMENTS

| 0202004 | 11/1986 | European Pat. Off. |
| 57-051176 | 3/1982 | Japan |
| 60-90251 | 5/1985 | Japan |
| WO06904 | 6/1900 | PCT Int'l Appl. |
| 1316994 | 6/1987 | U.S.S.R. |

*Primary Examiner*—John Kight, III
*Assistant Examiner*—Richard Jones
*Attorney, Agent, or Firm*—George P. Maskas; Kenneth P. Van Wyck; Dennis H. Rainear

[57] ABSTRACT

The hardening of a composition containing a phenolic resin solution and a magnesia aggregate is effected by mixing into such composition at a pH of at least 4.5: a compound which provides an acetate, adipate, 4-aminobenzeneslfonate, 1,2,4-benzenetricarboxylate, formate, glycolate, lactate, nitrate, benzenesulfonate, naphthalenesulfonate, methanesulfonate, phenolsulfonate, succinate, sulfamate, or toluenesulfonate anion to the composition; or an acetylacetone, 2-nitrophenol, 4-nitrophenol, salicylaldehyde compound; or a mixture of said compounds.

20 Claims, No Drawings

ACCELERATORS FOR REFRACTORY MAGNESIA

This application is a divisional application of my copending application Ser. No. 07/803,979 which was filed on Dec. 9, 1991, now U.S. Pat. No. 5,182,347, which in turn is a continuation-in-part of my copending application Ser. No. 07/616,879, which was filed on Nov. 21, 1990, now U.S. Pat. No. 5,182,346 and which in turn is a continuation-in-part of the then copending application Ser. No. 07/562,206 which was filed on Aug. 2, 1990, now U.S. Pat. No. 5,096,983 which issued on Mar. 17, 1992. This application is also related to my copending application Ser. No. 07/748,707 which was filed on Aug. 22, 1991 and which is directed to retarders for hardening a phenolic resin and magnesia aggregate.

BACKGROUND OF THE INVENTION

This invention relates to methods and compositions useful in the manufacture and use of ceramic and refractory compositions. More particularly this invention relates to methods and compositions for accelerating the hardening of compositions containing hardburned magnesia or deadburned magnesia, both of which are simply referred to herein as "magnesia aggregate", and a curable phenolic resin, with or without the inclusion of an ester functional hardening agent. The acceleration in hardening is accomplished by incorporating in the compositions certain compounds, such as those which supply: acetate; adipate; 1,2,4-benzenetricarboxylate (trimellitate); formate; glycolate; lactate; nitrate; succinate; sulfamate; phenolsulfonate; or toluenesulfonate anions to the composition; an acetylacetone (2,4-pentanedione); 2-nitrophenol; 4-nitrophenol; or salicylaldehyde compound; or a mixture of compounds which supply said anions or compounds.

It is often desirable to accelerate or shorten the time it takes for phenolic resins to harden a magnesia aggregate. This is particularly the case in cooler climates and at lower temperatures. Accelerators are also advantageous for reducing the strip time of molded or cast materials. The methods and compositions of this invention accomplish such acceleration in hardening.

DESCRIPTION OF THE RELATED ART

W. Adams, Jr. U.S. Pat. No. 2,424,787 of Jul. 29, 1947; R. Cooper et al U.S. Pat. 2,869,191 of Jan. 20, 1959; R. Cooper U.S. Pat. No. 2,869,194 of Jan. 20, 1959 Cooper U.S. Pat. No. 2,869,196 of Jan. 20, 1959; Cooper U.S. Pat. No. 2,913,787 of Nov. 24, 1959 and T. Murata et al U.S. Pat. No. 3,666,703 of May 30, 1972 relate to the use of alkali metal or alkaline earth metal oxides to harden phenolic resins.

Gupta U.S. Pat. No. 4,794,051 of Dec. 27, 1988 and Jpn. Kokai Tokkyo Koho JP 60/90251 of May 21, 1985 are directed to hardening of certain phenolic resins in the presence of a magnesium oxide and ester functional hardening agent.

P. Lemon et al U.S. Pat. No. 4,831,067 of May 16, 1989; A. Gerber U.S. Pat. No. 4,939,188 of Jul. 3, 1990; Re 32,720 to P. Lemon et al. of Jul. 26, 1988; Re 32,812 to P. Lemon et al. of Dec. 27, 1988; and PCT/GB89/01526 to P. Lemon et al. of Dec. 21, 1989 disclose the use of ester functional hardening agents for the room temperature hardening of phenolic resins.

R. Iyer et al U.S. Pat. No. 4,740,535 of Apr. 26, 1988 discloses the manufacture of a modified phenolic resole resin and compositions using such resin in the foundry and refractory arts. That patent also discloses curing such resin under highly acidic conditions with acids such as toluenesulfonic acid at ambient temperatures or by thermal curing. The use of various aggregates, including magnesia, are recited in the reference. Differences of this reference from the instant invention include the absence of highly acidic conditions for hardening the resin in the instant invention.

Additionally, J. Mitchell U.S. Pat. No. 2,712,533 of Jul. 5, 1955 discloses compositions comprising a novolac resin and magnesium oxide; Yoshino et al U.S. Pat. No. 4,282,288 of Aug. 4, 1981 discloses refractory compositions containing a powdered phenolic resin and additives such as magnesia and phosphates; G. Bobrowski et al. U.S. Pat. No. 4,964,917 of Oct. 23, 1990 discloses a method for retarding the hydration of concrete by addition of a chelating agent for calcium and eventually adding an accelerator to harden the composition; J. Stenders U.S. Pat. No. 4,473,654 of Sep. 25, 1984 relates to binding of refractory aggregates with various binding agents; T. Nishimura U.S. Patent 4,539,343 of Sep. 3, 1985 discloses the use of various additives to eliminate reddish color in mixtures of magnesia containing compositions and a phenolic resin; and Detlefsen et al. U.S. Pat. No. 4,961,795 of Oct. 9, 1990 shows the use of aliphatic alcohols to moderate or retard the hardening of phenolic resins with ester functional hardening agents.

European Patent Application 0202004 to Foseco International Limited which was published on Nov. 20, 1986 discloses refractory compositions of deadburned magnesite, a dispersing agent such as sodium alkyl sulfate, an ester functional hardening agent and a phenol formaldehyde resin.

Abstract of Soviet Union patent publication SU 1316994 of 87061 to K. Simonov et al. relates to magnesia aggregate refractories bound with phenolic resin and chloride and bromide salt additives.

Abstract of Japanese patent publication JP 57051176 dated 820385 which is assigned to Kawasaki Steel KK of 820318 relates to a refractory composition comprising a phenolic resin, fireproof aggregate and additives such as magnesium sulfate.

SUMMARY OF THE INVENTION

It has been found that the ambient temperature hardening of compositions containing magnesia aggregate and a curable, liquid phenolic resin, either alone or together with an ester functional hardening agent, can be accelerated by the use of certain additives. Such accelerator additives include: those which supply: acetate; adipate; 1,2,4-benzenetricarboxylate (trimellitate); formate; glycolate; lactate; nitrate; succinate; sulfamate; phenolsulfonate; or toluenesulfonate anions to the composition or compounds which supply acetylacetone (2,4-pentanedione); 2-nitrophenol; 4-nitrophenol; or salicylaldehyde to the composition.

The compositions of this invention are useful in the preparation of ceramics and various refractories such as shaped articles, e.g., bricks and castable monolithic shapes as well as refractory tile and the like.

In one aspect of the invention, a binder-aggregate composition is provided. The binder-aggregate comprises a mixture of: (a) magnesia aggregate; (b) a curable phenolic resin solution wherein the resin is present in sufficient quantity to harden or decrease the flow of the mixture on standing at ambient temperature; (c) an accelerator of this invention; and (d) optionally, an ester functional hardening agent and conventional additives used in refractory and ceramic compositions. Such compositions have a pH of at least 4.5 and, as the composition ages and becomes more viscous, the pH will increase such as that of 7 to 10 or higher. The resin is present in sufficient quantity to bind the aggregate on thermal curing of the resin.

In another aspect, the invention involves a method for making a binder-aggregate composition which comprises mixing the ingredients used in the above mentioned binder-aggregate composition. Preferably, the mixing produces a composition which is wet and shapable.

In still another aspect, a binder-aggregate composition of this invention containing a phenolic resole resin together with the magnesia aggregate and accelerator is formed into a desired shaped article, and the article can be allowed to stand at ambient temperature to develop the requisite ambient temperature strength which is also referred to as green strength.

Still further aspects of the invention involve thermal curing of the shaped article and optionally heating at a still higher temperature to carbonize the resin binder to form a refractory body.

DETAILED DESCRIPTION OF THE INVENTION

The Phenolic Resin

The phenolic resin can be a novolac solution, a resole solution, a novolac in a resole solution or a mixture of the foregoing.

The phenolic resole resin solutions which may be used in this invention can be that of phenol formaldehyde or those wherein phenol is partially or completely substituted by one or more phenolic compounds such as cresol, resorcinol, 3,5-xylenol, bisphenol-A, or other substituted phenols and the aldehyde portion can be partially replaced by a phenol reactive aldehyde such as acetaldehyde, furaldehyde or benzaldehyde.

Resole resins are thermosetting, i.e., they form an infusible three dimensional polymer upon application of heat and are produced by the reaction of a phenol and a molar excess of a phenol-reactive aldehyde typically in the presence of an alkali or alkaline earth metal compound as condensing catalyst at a pH above 7. Typically, the resole resin will be a phenol-formaldehyde resin produced by reacting phenol and formaldehyde in a molar ratio (phenol: formaldehyde) within the range of from about 1:1 to 1:3. A preferred molar ratio for use in this invention ranges from about one mole of the phenol for each mole of the aldehyde to about 1 mole of phenol for 2.2 moles of the aldehyde and particularly a range of phenol to aldehyde of 1 to 1.2 to 1 to 2. The phenolic resole resin will usually be in aqueous solution. Preferred phenolic resole resins used in this invention have less than about 1% and preferably not more than 0.5% by weight of soluble sodium or potassium.

Resoles can be prepared with a variety of condensation catalysts. These include alkali and alkaline earth oxides and hydroxides, quaternary ammonium hydroxides, as well as ammonia and organic amines. It is preferable to have the accelerator fully soluble and stable in the phenolic resin. In such case, particularly where the phenolic is a resole solution, the phenolic resin and the accelerator can advantageously be placed in storage. A less desirable system is wherein a portion of the accelerator is uniformly dispersed as a fine powder in the phenolic solution. Least desirable is when a portion of the accelerator forms a precipitate which settles out upon storage.

The pH of the phenolic resole resin used in this invention will generally vary from about 4.5 to 9.5 with a pH of 5 to 8.5 being preferred. The molecular weight of the resin will vary from about 200 to 3,000 weight average molecular weight with 300 to 1,000 being preferred. All other things being equal, higher molecular weights and lower free-phenol content will provide shorter ambient temperature gel or hardening time and increase strength development with resole resins. The weight average molecular weight is measured using gel permeation chromatography and phenolic compounds and polystyrene standards. The sample molecular weight to be measured is prepared as follows: the resin sample is dissolved in tetrahydrofuran and slightly acidified with 1N hydrochloric or sulfuric acid and dried over anhydrous sodium sulfate. The salts which result are removed by filtration and the supernatant liquid run through a gel permeation chromatograph.

The resin solids in the resole resin solution can vary over a broad range such as that of about 50% to 90% by weight of the phenolic resole resin. Preferably, the resin solids vary from about 50% to 80% by weight of the phenolic resole resin. The viscosity of the resin can vary over a broad range such as that of from about 100 to 10,000 cps at 25° C. Preferably, the viscosity varies from about 250 to 5,000 cps at 25° C. The viscosity measurements herein are given in centipoise (cps) as measured by a Brookfield RVF viscometer at 25° C. or by Gardner-Holt viscosities at 25° C. The Gardner-Holt viscosities which are in centistokes are multiplied by the specific gravity (generally 1.2) to give the cps at 25° C.

The quantity of free phenol in the resole resin can vary over a broad range such as from about 5% to 15% based on the weight of the resin (BOR). Increasing the quantity of free phenol increases the room temperature mix life of the hardenable binder-aggregate composition.

The liquid portion of the resole resin is water or water together with free phenol and optionally a non-reactive solvent. Solvents in addition to water can be selected from alcohols of one to five carbon atoms, diacetone alcohol, glycols of 2 to 6 carbon atoms, mono- and dimethyl or butyl ethers of glycols, low molecular weight (200–600) polyethylene glycols and methyl ethers thereof, phenolics of 6 to 15 carbons, phenoxyethanol, butyl acetate, propylene glycol, dipropylene glycol, methyl ethyl ketone, methyl isobutyl ketone, cyclic ethers such as tetrahydrofuran and m-dioxolane, and the like.

Typical water contents of the resole resins used in this invention will vary from about 3% to 20% by weight (BOR). Preferably the water content of the resole resin is from about 3% to 15% BOR (based on the weight of resin). Apart from water in the resin as manufactured, additional water can be mixed into the resin itself or the binder-aggregate composition. Preferably the total water content of the binder-aggregate composition varies from about 0.5% to 5% by weight. Increasing the water content of the resin or total water in the binder-aggregate composition decreases the ambient temperature mix life of the binder-aggregate composition.

The Novolac Resin

The novolac resin can be used as a liquid solution when used alone as the phenolic resin or as a liquid or solid when used together with a resole solution.

For use in this invention, the novolac will have a molecular weight of about 300 to 3,500. Solvents which can be used for dissolving the novolac include: ethylene glycol; furfuryl alcohol, diacetone alcohol, glycol ether acetate; glycol ether; and mixtures thereof as well as lower alcohols, e.g., methanol, ethanol, 1- and 2-propanol, 1-butanol and the like. Preferred novolac solids content will be from about 50% to 70% by weight of the novolac solution. Preferred viscosities for the novolac solutions are from about 2,000 to 6,000 cps at 25° C. However, ground or powdered novolac can be added to a resole solution for forming the binder-aggregate composition.

A novolac resin is one prepared with a deficiency in aldehyde so that when used alone, it is normally not curable unless a curing agent such as hexamethylenetetraamine ("hexa") is added together with heat for a thermal cure. A novolac resin may be defined as the generally acidic resinous reaction product of a phenolic material and an aldehyde that, for practical purposes, does not harden or convert to an insoluble, infusible condition upon heating but remains soluble and fusible.

By "novolac" herein is meant novolac resins, polymers, copolymers, terpolymers or mixtures comprising a phenolic material such as phenol, cresol, or xylenol or mixtures thereof reacted with formaldehyde or other commercially used reactants for production of novolacs such as benzaldehyde, furaldehyde, acetaldehyde and acetone. The formaldehyde: phenolic mole ratio of the novolacs useful in the present invention is in the range of about 0.5:1 to about 0.9:1, and preferably about 0.6:1 to 0.8:1, wherein the phenolic material is selected from phenol, o-, m-, and p-cresol, xylenols and mixtures thereof. Preferably, the novolac resin is prepared by condensing formaldehyde and phenol at a pH of less than about 4, and more preferably about 2.

Hexa and/or other methylene-generators, such as for example formaldehyde or paraformaldehyde, can be added to the novolac containing binders of the present invention. When used, hexa is added at a level of about 4% to about 15%, based on the weight of total novolac phenolic resin and more preferably at about 5% to about 10%. However, the novolac can also be cured in the presence of a resole since resoles use higher mole ratios of formaldehyde to provide excess methylol groups, some of which in turn can react with the novolac. When the binder-magnesia aggregate does not contain a resole it is preferred that the quantity of calcium oxide in the magnesia aggregate be from 1.5 to 4% by weight of the magnesia aggregate since the rate of hardening of the binder-aggregate increases with increased calcium oxide content.

The compositions of this invention can utilize a blend of novolac and resole components. By "component" herein is meant an individual resin of a blend, mixture, reaction product, or other combination of resins containing the novolac or resole of reference. Such resin binders also have the desirable properties of low thermal conductivity and high dimensional stability and abrasion resistance. When the hardenable (curable) composition contains both a resole and novolac binder, it is preferred that there be about 1 to 4 parts of resole by weight for each part of novolac. In such case it is also preferred that powdered novolac be added to the resole resin or binder-aggregate mixture.

The quantity of resin used in the binder-aggregate mixture is that which is sufficient to bind the aggregate on ambient temperature hardening in the case of a resole or to decrease the flowability of the mixture in the case a novolac is used alone at ambient temperature or to bind the mixture on thermal curing in the case the phenolic is a resole, a novolac or mixtures thereof. Thus, the quantity of resin based on aggregate in the binder-aggregate mixture can vary over a broad range such as from about 3% to 15% by weight of resin based on the weight of the magnesia aggregate and particularly from about 3% to 8% of resin based on the weight of magnesia aggregate. As used in this invention, "resoles" are solutions of the phenolic involved even though further referred to as "solutions" whereas "novolacs" are solids.

The Magnesia Aggregate

The magnesia aggregate can be either deadburned magnesia or hardburned magnesia. The hardburned and deadburned magnesia aggregates are simply also referred to herein as magnesia aggregate. Deadburned magnesia is also referred to as deadburned magnesite, refractory magnesia or periclase. To the refractories art, the terms "deadburned magnesite" or "deadburned magnesia" are used interchangeably to describe the dense, highly crystalline, periclase product of good stability, which is used to fabricate refractory brick and the like. Such magnesia products can be obtained from the Martin Marietta Magnesia Specialties Company under the designator of MagChem Magnesum Oxide Products.

Reactivity and surface area of magnesium oxide (magnesia) differ greatly depending on the procedure used for manufacture of the magnesia. These magnesia products are made by calcining magnesite ($MgCO_3$) or such magnesium compounds as the hydrate, or chloride at different temperatures. Lightburned grades of magnesium oxide are prepared by calcining at temperatures ranging from about 1600° F. to about 1800° F. (871° C. to 982° C.). Hardburned and deadburned magnesia aggregates are prepared by calcining at substantially higher temperatures. Thus, hardburned and deadburned magnesia aggregates are prepared by calcining at temperatures of 2800° F. (1540° C.) and above. In one reference, namely Kirk-Othmer, Encyclopedia of Chemical Technology (John Wiley & Sons, N.Y., 1982) Vol 20 page 8 under the section on Refractories, both hardburned and deadburned magnesia aggregate appears to be treated the same since that reference states that deadburned magnesite is obtained by firing naturally occurring magnesium carbonate at 1540° C. to 2000° C. However, for the purposes of this application, the calcining temperatures set forth in a brochure of Martin Marietta Magnesia Specialties Company entitled MagChem © Magnesium Oxide Grades and Uses will be employed wherein it states that hardburned grades are prepared by calcining at temperatures ranging from about 2800° F. to 3000° F. (1540° to 1649° C.) and that the deadburned grade of magnesium oxide is calcined at temperatures of over 4000° F. (2204° C.). There are also differences in surface areas for the various magnesias. Thus, lightburned magnesia has a surface area of about 10 to 200 or more square meters per gram. Hardburned magnesia and deadburned magnesia have a surface area of about one or less than one square meter per gram.

Commercially available magnesia aggregate commonly analyzes from about 91% to over 99% of MgO and preferably 96% to over 99% of MgO with not more than 4% of CaO by weight as the main impurity and preferably the magnesia aggregate will contain not more than 3.50% of CaO. As the quantity of lime (CaO) increases, the mix life in the binder-magnesia aggregate decreases. Illustrative of a suitable hardburned magnesia aggregate there can be mentioned MagChex® 10-40 which has a 98.2% MgO content on an ignited basis, 0.25% loss on ignition, 0.90% CaO, and smaller quantities of other oxides with 96% of the product passing a −40 U.S. Sieve with a median particle size of 30 microns and a surface area of less than 1 square meter per gram.

For use in refractory compositions, the magnesia grain is crushed and sized in various fractions. Commonly used grain sizes of deadburned or hardburned grades of magnesia can be used in this invention. A typical mixture of coarse, intermediate and fine grain fractions of deadburned magnesia suitable to achieve high bulk density and low porosity, such as for use in manufacture of refractory articles useful in basic oxygen process furnaces, will have Tyler standard screen sizes as follows: 30% to 35% passing 4 mesh and retained on 10 mesh; 30% to 40% passing a 6 mesh and retained on 28.mesh; and 30% to 35% ball mill fines (less than 100 mesh). Magnesia aggregate used in this invention preferably contains from about 10% to 25% of such aggregate which is ground to a powder.

By the term "room temperature hardening" we mean the hardening of binder-aggregate compositions of this invention at temperatures of about 60° F. to 90° F., particularly about 65° F. to 80° F. However, the use of accelerators in the processes and compositions of this invention accelerate the hardening at lower and higher temperatures such as 60° F. to 110° F., such temperatures being referred to herein as ambient temperatures. Increase in viscosity with subsequent gelation and hardening of resole resins, even in the absence of magnesia aggregate, at ambient temperatures are the first steps toward curing. Nevertheless, when the novolac is in contact with magnesia aggregate at ambient temperature, there is a viscosity increase, decreased flow or simply hardening of the binder-aggregate composition of this invention. In addition to hardening at ambient temperature, the binder-aggregate compositions of this invention can be thermally cured after ambient temperature hardening or the compositions can be thermally cured prior to such hardening. The term "thermal curing" as used herein means curing of the composition at a temperature of at least 170° F. (77° C.) such as up to 248° F. (120° C.) and generally at a temperature of at least 212° F. (100° C.).

The Ester Hardening Agent

The ester functional hardening agent, when used, further accelerates the hardening of the phenolic resin in the binder-magnesia aggregate compositions of this invention. The ester functionality can be provided by lactones, cyclic organic carbonates, carboxylic acid esters, or mixtures thereof. Generally, low molecular weight lactones are suitable as the ester functional hardening agent, e.g., beta or gamma-butyrolactone, gamma-valerolactone, caprolactone, beta-propiolactone, beta-butyrolactone, beta-isobutyrolactone, beta-isopentyllactone, gamma-isopentyllactone, and delta-pentyllactone. Examples of suitable cyclic organic carbonates include, but are not limited to: propylene carbonate; ethylene carbonate; 1,3-butanediol carbonate; 1,2-pentanediol carbonate; and 1,3-pentanediol carbonate.

The carboxylic acid esters which can be used in this invention include phenolic and aliphatic esters. The aliphatic esters are preferably those of short or medium length, e.g., about 1 to 4 carbon mono- or polyhydric, saturated or unsaturated alcohols with short or medium chain length, e.g., about 1 to 10 carbon aliphatic, saturated or unsaturated carboxylic acids which can be mono- or polycarboxylic. The preferred aliphatic esters are those of alkyl, mono-, di-, or trihydric alcohols with alkyl, or mono-, or diunsaturated acids which can be mono-, di-, or tricarboxylic.

As to aromatic esters, such esters can be obtained by esterifying the aromatic, e.g., phenolic group or groups of a mono- or polyhydric aromatic phenol to prepare a formate or acetate ester of such aromatic compound. Additionally, the aromatic ester can be an esterified phenolic compound containing one or more phenolic hydroxyl groups and/or one or more esterified phenolic hydroxyl groups and further containing one or more esterified methylol groups positioned ortho and/or para to a phenolic hydroxyl group or esterified phenolic hydroxy group. Such phenolic esters and their method of manufacture are disclosed in International Application No. PCT/GB89/01526 having a filing date of Dec. 21, 1989 to Lemon et al.

It will be understood that the esterified phenolic compound used may be a mono-, di- or polynuclear phenol wherein at least one esterified methylol group is attached to an aromatic ring carbon atom ortho or para to a phenolic hydroxyl group or esterified phenolic hydroxyl group. The acid portion of the phenolic esters can be the same as those of the aliphatic esters.

Specific carboxylic acid esters include but are not limited to: n-butyl formate; ethylene glycol diformate; methyl and ethyl lactates; hydroxyethyl acrylate; ethylene glycol diacetate; triacetin (glycerol triacetate); diethyl fumarate; dimethyl maleate; dimethyl glutarate; dimethyl adipate; 2-acetyloxymethyl phenol; 2-methacryloxymethyl phenol; 2-salicyloxylmethyl phenol; 2-acetyloxymethyl phenol acetate; 2,6-diacetyloxymethyl p-cresol acetate; 2,4,6- triacetyloxymethyl phenol; 2,4,6-triacetyloxymethyl phenol acetate; 2,6-diacetyloxymethyl phenol acetate; 2,2', 6,6'-tetraacetyloxymethyl bisphenol A; and 2,2', 6,6'-tetraacetyloxymethyl bisphenol A diacetate. Also suitable are: cyanoacetates derived from 1 to 5 carbon atom aliphatic alcohols; formates and acetates of benzyl alcohol, alpha, alpha'-dihydroxyxylenols, phenol, alkyl substituted phenols, dihydroxybenzenes, bisphenol A, bisphenol F , and low molecular weight resoles. At times, it is advantageous to use mixtures of the ester functional hardening agents.

The ester functional hardening agent is present in an amount sufficient to increase the rate of hardening of such compositions at ambient temperature and, in the case of resole containing compositions, increase tensile and compressive strength of the ambient temperature hardened composition. The quantity of ester used in the binder aggregate compositions of this invention will vary over a broad range such as that of about 5% to 25% by weight of the phenolic resin and preferably from about 5% to 15% by weight of the resin. The exact quantity will depend on the particular ester hardener used, the amount and specific magnesia aggregate used, the temperature at which the composition is used or stored, and desired results.

The Accelerators

The accelerators used in this invention include acetic acid, sodium acetate, magnesium acetate, calcium acetate, formic acid, ammonium formate, potassium formate, glycolic acid, sodium glycolate, tetramethylammonium glycolate, lactic acid, sodium lactate, calcium lactate, adipic acid, magnesium adipate, succinic acid, ammonium succinate, 2-nitrophenol, 4-nitrophenol, salicylaldehyde, trimellitic acid (1,2,4-benzenetricarboxylic acid), sulfanilic acid (4-aminobenzenesulfonic acid), sodium sulfanilate, sulfamic acid, benzenesulfonic acid, naphthalenesulfonic acid, methanesulfonic acid, ammonium sulfamate, magnesium sulfamate, phenolsulfonic acid, the sodium salt of phenolsulfonic acid, nitric acid, lithium nitrate, potassium nitrate, acetylacetone (2,4-pentanedione), toluenesulfonic acid, the potassium salt of toluenesulfonic acid, the ammonium salt of benzenesulfonic acid, the ammonium salt of naphthalenesulfonic acid, the sodium salt of methanesulfonic acid, and the like. Additional salts of the above mentioned accelerator acids which have some solubility in the phenolic resin are also operable. Such salts include those which have a water solubility of at least 0.1% and preferably at least 2% by weight at 25° C., so that the accelerator compound can provide anions, e.g., sulfamate, to the compositions. It can be seen that for ionizable compounds, the accelerator can be in the form of an acid or a salt.

Some of the accelerators are strong acids and care needs to be exercised to keep the binder-aggregate at a pH of about 4 or above. Otherwise acid catalysis of the phenolic may take place and prematurely harden the binder-aggregate composition. When sulfanilic acid (4-aminobenzenesulfonic acid) or the sulfanilate anion is the accelerator, ester hardening agents should be avoided. The reason for this is that such esters appear to inhibit the accelerating effect of sulfanilic acid or the sulfanilate anion.

For ionizable compounds, it is the anion, e.g., toluenesulfonate or nitrate, which determines whether these materials are accelerators. Thus, the cation, e.g., Na+, H+, K+ does not change the anion from being an accelerator although it may have some effect on the amount of acceleration. Thus, there would normally be less hardening acceleration for compounds having less solubility in the phenolic resin solution. In the case of ionizable accelerator compounds, such compounds provide the accelerator anions to the composition. For this, some solubility in the composition, e.g. binder-aggregate or water, is needed. However, some compounds which do not appear to readily ionize are also accelerators. Such accelerators include the nitrophenols.

A benefit of using ammonium or an amine salt of an acid is that it is more soluble than sodium or potassium salts. To prevent too low of a pH, which could lead to acid catalyzed polymerization, partial neutralization by an amine permits higher levels of acid to be used. The salts of the accelerator acids are advantageously that of amines. Illustrative of such amines there can be mentioned: N,N-dialkylethanolamines having from 1–3 carbon atoms in each alkyl group and preferably 1 to 2 carbon atoms; o- and p-dialkylaminmethyl phenol having from 1 to 2 carbon atoms in each alkyl group; N,N-dimethylbenzylamine; N-alkylpiperidine having from 1 to 2 carbon atoms in each alkyl group; N-methyl or N-ethylmorpholine; N,N,-dimethylethanolamine; N,N,-diethylethanolamine; N,N,-dimethylbenzylamine; and the like. The foregoing amines are tertiary amines. Primary and secondary amines can be used with acidic accelerators where there is no undue destabilization of resin relative to the use of a tertiary amine. In any event, primary and secondary amines should be avoided when an organic ester is in the binder-aggregate composition as a hardening agent. Illustrative of primary and secondary amines for preparing salts of the acidic accelerators there can be mentioned: ethanolamine and its N-monomethyl and its N-monoethyl derivatives; 1- and 2-aminopropanols; N-methyl benzylamine; morpholine; piperidine and diethanolamine.

Preferably, the accelerator anion is combined with hydrogen as the cation or cations and used in the acid form of the accelerator compound, e.g., as in sulfamic acid or glycolic acid. Also preferred cations for combining with the accelerator anions of this invention are those of the alkali metals, magnesium, calcium, ammonium, and lower alkyl substituted ammonium having from 1 to 4 carbon atoms in each alkyl group.

The quantity of accelerator compound used in this invention is an amount or quantity sufficient to increase the rate of ambient temperature viscosity increase, gelation and hardening of the binder-aggregate material and such quantity can vary over a wide range depending on the activity of the particular accelerator, the amount of acceleration desired, the room or ambient temperature, the quantity of calcium oxide in the composition (generally as an impurity in the magnesia aggregate) and whether an ester hardening agent is also used. Thus the quantity of accelerator will generally vary from about 0.5% to 6% by weight of the phenolic resin, also referred to as "BOR".

Fillers, Aggregates and Modifiers

The compositions of this invention can include fillers, modifiers, and aggregates, in addition to the magnesia aggregate, such as those which are conventionally used with phenolic resins. The additional aggregate material may be a particulate material such as that in granular, powder, or flake form. Suitable additional aggregate materials include but are not limited to: alumina, zirconia, silica, zircon sand, olivine sand, silicon carbide, silicon nitride, boron nitride, bauxite, quartz, chromite, and corundum and mixtures thereof.

The binder-aggregate compositions produced by combining the curable resin binder, magnesia aggregate, and accelerator may additionally comprise any of a number of optional modifiers or additives including: non-reactive solvents; silanes; hexamethylenetetraamine; clays; graphite; iron oxide; carbon pitch; silicon dioxide; metal powders such as aluminum, magnesium, and silicon; surfactants; dispersants; air detraining agents; and mixtures thereof.

Mixing of the ingredients for the binder-aggregate compositions of this invention may be accomplished in any means known in the art, i.e., using any industrial mixer such as an Eirich mixer, a Simpson mixer , a Muller mixer, and the like. The binder aggregate mixture which results from the mixing step may be molded by any technique known in the art and subjected to pressure to form a desired shape. The binder in the binder-magnesia aggregate composition will wet the aggregate so that the composition becomes shapeable or can fill out a mold such as by vibration. For example, the binder-aggregate may be subjected to compression, isostatic pressing, transfer molding, extrusion, or injection molding at desired temperatures and pressures.

Following shaping the shape may be permitted to harden at ambient temperature or it may be further hardened by thermally curing before or after ambient temperature hardening. A typical heat treatment involves a continual increase in temperature up to about 120° C. (248° F.) to 205° C. (400° F.) to effect thermal cure of the resin binder and evaporate off water and organic solvent. Further heat treatment up to 800° C. to 1,000° C. further promotes carbonization of the resin binder.

The pH of the mixture comprising the phenolic resin, magnesia aggregate and accelerator will have a pH of at least 4.5 and depending on how long the mixture has been prepared, a higher pH such as that of about 7 to 10. The magnesia aggregate is basic and when the phenolic resin or mixture of phenolic resin and accelerator is acidic, the pH rises with time and the resin solidifies at a pH above 7.

In order that those skilled in the art may more fully understand the invention presented herein, the following procedures and examples are set forth. All parts and percentages in the examples, as well as elsewhere in this application, are by weight, unless otherwise specifically stated.

Resin Characterization

Resin B. This resole resin was prepared by charging a mole ratio of formaldehyde to phenol of 1.20 in the presence of an alkaline catalyst. Resin B had: a viscosity of 4,100 cps at 25° C.; a water content of 7.9%; a free phenol content of 14.6%; a solids content of 79%; an approximate weight average molecular weight of 566, excluding the free phenol ; and a pH of 7.9.

Resin C. This resole resin was prepared by charging a mole ratio of formaldehyde to phenol of 1.25 in the presence of an alkaline catalyst. Resin C had the following properties: a viscosity of 3,000 cps at 25° C.; 7.6% of water; 13% of phenol; 78% solids; an approximate weight average molecular weight, excluding the free phenol, of 406; and a pH of 7.8.

Resin D. This resole resin was prepared by charging a mole ratio of formaldehyde to phenol of 1.25 in the presence of an alkaline catalyst. Resin D had the following properties: a viscosity of 3,000 cps at 25° C.; 9.75% of water; 11% of free phenol; 77% solids; an approximate weight average molecular weight of 536, excluding the free phenol; and a pH of 7.9.

Preparation of Resin D. A solution of 3.621 kg (38.55 moles) of phenol was reacted with 2.885 kg of 50% formalin (48.08 moles) and 38 g of 50% sodium hydroxide at 60–75° C. over 50 minutes. The reaction was then heated at 90–92° C. for 40 minutes and then cooled to 60° C. at which time vacuum distillation was started at 26 inches of mercury. Approximately 31% of distillate was removed. The residue was heated at 75° C. for several hours until a viscosity of 3,000 cps at 25° C. was reached. This resin is further characterized above under the heading of Resin Characterization.

Preparation of Resin B. Resin B is prepared in much the same manner as Resin D using a formaldehyde/phenol mole ratio of 1.20, but was advanced to a slightly higher molecular weight and higher viscosity at essentially equal solids.

Preparation of Resin E. This resole resin was prepared in a similar manner to Resin B by replacing sodium hydroxide catalyst with 80 mole % of potassium hydroxide. Resin E had: a viscosity of 900 cps at 25° C.; 6.4% of water; 14% of free phenol; 79% solids; and approximate weight average molecular weight of 370 (including free phenol); and a pH of 7.9.

Procedure for Determining Effect of Additives on Qualitative Flow of Phenolic Resin/Magnesia Aggregate Mixes This procedure is also referred to as "Qualitative Flow Procedure". Glass vials (28 mm×57 mm) were charged with 5.0 g resin, additive and solvent, if any, and after solution was effected, 4.0 g of the High Purity magnesia or if specifically recited "Standard Grade" magnesia, which was mixed well for one minute with a spatula and then mixed for another minute using an S/P Vortex Mixer of American Scientific Products at a setting of 9–10. The term "High Purity" magnesia refers to powdered (to pass a 200 mesh U.S. Sieve Series screen) deadburned magnesia having a 99+% content of MgO and 0.59 Ca % which, as CaO, amounts to 0.82% by weight. The term "Standard Grade" magnesia is used herein to describe deadburned magnesia containing about 92% of MgO and 2.48% CaO (1.77% Ca) by weight having the same particle size set forth for High Purity magnesia. Relative viscosities of the mixes, with sets of 2 to 5 being compared simultaneously, were observed by laying at right angles, i.e. on their sides, at various intervals upon standing at room temperature (23°–25° C.). All mixes were quite fluid initially but generally became immobile and tack-free in 1 to 7 days. Immobile mixes were probed with an applicator stick to determine relative degree of tackiness which range from sticky initially, to taffy-like and then to tack-free (i.e., the stick pulls out clean and free of resin). As the viscosity of a fluid mix increases the mix becomes immobile. Further increases in viscosity are then shown by stickiness of the immobile mixture to the applicator stick. Still further viscosity increase is evidenced by a taffy-like tackiness and an even more advanced viscosity is evidenced by withdrawing the applicator stick clean and free of the mixture. Additionally, comparative viscosity increases were recorded, e.g., $3>2>1$ means that the viscosity of Mix 3 was higher or greater than ($>$) that of Mix 2 which in turn was greater than Mix 1. The use of more than one greater than symbol "($>$)" indicates a greater difference, i.e., viscosity increase, as compared to the use of simply one "($>$)" symbol. The mixtures which did not contain an additive are also referred to as "Controls".

EXAMPLE 1

Effect of Acetic Acid or Formic Acid Additives on Qualitative Flow of Resin C/High Purity Magnesia This example was performed to test the comparative effect of acetic acid in Mix 2 and formic acid in Mix 3 in relation to the Control, Mix 1, which did not contain an additive. The tests were performed in accordance with the hereinabove described Qualitative Flow Procedure. Each of the mixes contained 0.2 g of ethylene glycol and the quantity of acetic acid or formic acid in each Mix was 0.06 g which 1.2% based on the weight of resin.

It can be seen from Table 1 that both acetic acid and formic acid accelerate hardening and that formic acid was a more effective hardener as compared to acetic acid. Use of the chemical equivalent of sodium acetate in place of acetic acid or hardburned magnesia instead of deadburned magnesia in this example will produce similar results.

TABLE 1

EFFECT OF ACETIC ACID OR FORMIC
ACID ADDITIVES ON QUALITATIVE
FLOW OF RESIN C/HIGH PURITY MAGNESIA

| Hours Elapsed | Order of Viscosity Increase For the Various Mixes |
|---|---|
| 0.5–1 | 3>2>1 |
| 3 | 3>2>>1 |
| 5 | 3>>2>>1 Mix 1 is still quite fluid. |
| 24 | 3>2>>>1 Mix 1 is still fairly fluid. |
| 34 | 3 is non-tacky. Mix 2 is still tacky. |
| 47 | Mix 1 is still flowable. |
| About 59 | Mix 2 is non-tacky. |
| 96 | Mix 1 is slightly mobile, sticky. |

EXAMPLE 2

Effect of Glycolic, Lactic and Malic Acids on Qualitative flow of Resin C/High Purity Magnesia This example was performed in accordance with the Qualitative Flow Procedure to test the comparative effect on viscosity of Mix 2 which contained glycolic acid (hydroxyacetic acid) at a concentration of 1.1% BOR; Mix 3 which contained lactic acid (2-hydroxypropionic acid) at 1.2% BOR; and Mix 4 which contained malic acid (hydroxysuccinic acid) at 1.2% BOR; in relation to Mix 1 which did not contain an additive.

It can be seen from Table 2 that glycolic and lactic acid enhance viscosity increase, i.e., they acted as accelerators. Malic acid shows an apparent initial thixotropic effect but in reality retards viscosity increase.

TABLE 2

EFFECT OF GLYCOLIC, LACTIC AND
MALIC ACIDS ON QUALITATIVE FLOW
OF RESIN C/HIGH PURITY MAGNESIA

| Hours Elapsed | Order of viscosity Increase Of the Various Mixes |
|---|---|
| 1–6 | 4>>2>3>1 |
| 23 | 2,4>>3>1 |
| 24 | 2>3>>1>>>4 Mix 2 is immobile but still tacky. Remixed all the samples after 24 hrs. |
| 72 | Mix 4 still shows flow |

Following the procedure of Example 2 but using hardburned magnesia or Standard Grade magnesia instead of High Purity magnesia the glycolic acid will show its accelerating effect on the composition.

EXAMPLE 3

Effect of Adipic Acid, Succinic Acid and 4-Nitrophenol on the Flow of Resin D/High Purity Magnesia This example was performed in accordance with the Qualitative Flow Procedure to test the comparative effect of: Mix 2 containing adipic acid at a concentration of 1.6% BOR; Mix 3 containing succinic acid at a concentration of 1.6% BOR; and Mix 4 containing 4-nitrophenol at a concentration of 4% BOR; in relation to Mix 1 which did not contain additive.

The results of the tests in Example 3 are set forth in Table 3. It can be seen from Table 3 that adipic acid, succinic acid and 4-nitrophenol act as viscosity accelerators. Similar results are obtained by use of hardburned magnesia in place of the deadburned magnesia in this example. Also, acceleration results are shown by adding to Mix 2 10% BOR of gamma butyrolactone, propylene carbonate or triacetin.

TABLE 3

EFFECT OF ADIPIC ACID, SUCCINIC ACID
AND 4-NITROPHENOL ON THE FLOW OF
RESIN D/HIGH PURITY MAGNESIA MIXTURE

| Hours Expired | Order of Viscosity Increase for the Various Mixes |
|---|---|
| 1 | 2>3>4 which is equal or slightly greater than 1. |
| 4 | 2>3>4>1. |
| 6 | Mix 2 moves very slowly. |
| 23 | Mixes 2 and 3 show no flow and are tack-free, Mix 1 shows slight flow and Mix 4 shows no flow but is not tack-free. |
| 47 | Both Mixes 1 and 4 are tack-free but Mix 4 is slightly firmer. |

EXAMPLE 4

Effect of Salicylaldehyde, Salicylamide and 2-Nitrophenol on Qualitative Flow of Resin D/High Purity Magnesia This example was performed to show changes in viscosity in accordance with the Qualitative Flow Procedure described hereinabove with: Mix 2 containing salicylaldehyde at a concentration of 4.4% BOR; Mix 3 containing salicylamide at a concentration of 4.4% BOR; Mix 4 containing 2-nitrophenol at a concentration of 4.4% BOR; and Mix 1 which was the Control and did not contain an additive. The results of the tests are shown in Table 4. It can be seen from Table 4 that after one day, salicylaldehyde and 2-nitrophenol increase mix viscosity relative to the Control and Salicylamide.

TABLE 4

EFFECT OF SALICYLALDEHYDE, SALICYLAMIDE
AND 2-NITROPHENOL ON QUALITATIVE FLOW
OF RESIN D/HIGH PURITY MAGNESIA

| Hours Elapsed | Order of Increased Viscosity for the Various Mixes |
|---|---|
| 2.5–7 | 2>4>1,3 |
| 23 | 2,4>1,3 Mixes 2 and 4 are essentially immobile but not tack-free. Mixes 1 and 3 move very slowly. |
| 48 | All mixes are immobile and tack-free. |

EXAMPLE 5

Qualitative Flow Studies of Resin B/High Purity Magnesia

This example was run in accordance with the Qualitative Flow Procedure. Results were noted of a control with no additives in comparison with samples containing various additives, as set forth below. The test period lasted over a period of 5 days. It was observed that trimellitic acid (1,2,4-benzenetricarboxylic acid) additive at 1.0% BOR acted as a moderately effective accelerator. Sulfanilic acid (4-aminobenzenesulfonic acid) additive at a concentration of 1.5% BOR acted as a mild accelerator and aspartic acid additive at a concentration of 1.5% BOR acted as a mild retarder. Use of the chemical equivalent of potassium sulfanilate (the potassium salt of 4-aminobezenesulfonic acid) or the chemical equivalent of ammonium sulfanilate in place of sulfanilic acid will provide similar accelerator results.

EXAMPLE 6

Effect of Additives on Flow of Resin B/High Purity Magnesia

This example was performed in accordance with the Qualitative Flow Procedure. In this example: Mix 1 is the control with no additive; Mix 2 is phenolsulfonic acid at 1.4% BOR as the additive; Mix 3 is lithium nitrate as the additive at 1.1% BOR; and Mix 4 contained ammonium sulfamate as the additive at a concentration of 1.4% BOR. All the mixes contained 1.4% BOR of added water. The results of this example are shown below.

| Hours Elapsed | Order of Viscosity Increase For the Various Mixes |
|---|---|
| 0.5 | 4>2>3>1 where 4>>1 |
| 1 | 4>>2 equal or slightly greater than 3>1 |
| 2 | 4>>2 equal or slightly greater than 3>>1 Mix 3 was immobile while Mix 1 is quite fluid. |
| 3 | 4>2,3>>1 Mix 4 is tack-free. |
| 9 | 3>2>>1 Mix 1 still shows moderate flow. |
| 14 | Mix 3 is close to tack-free but Mix 2 is not. |
| 21 | Mixes 2 and 3 are tack-free. |
| 31 | Mix 1 still flows. |
| 48-72 | Mix 1 is sticky. |
| 96 | Mix 1 is tack-free. |

It can be seen from the results of Example 6 that: ammonium sulfamate is a powerful accelerator; and that phenolsulfonic acid and lithium nitrate are good accelerators. In an experiment run in a similar manner to the above, acetylacetone (2,4-pentanedione) at a concentration of 2% BOR showed modest accelerator activity, i.e., less than that in the above Example 6. Use of the chemical equivalent of sodium sulfamate in place of the ammonium sulfamate in this example as well as use of the chemical equivalent of ammonium phenolsulfonate in place of phenolsulfonic acid or the chemical equivalent of potassium nitrate in place of lithium nitrate will produce similar results.

EXAMPLE 7

Effect of Additives on Flow of Resin E/High Purity Magnesia

This example was performed in accordance with the Qualitative Flow Procedure. Mix 1 was the control and did not contain an additive. Mix 2 contained p-toluenesulfonic acid as the additive at a concentration of 2% BOR. Mix 3 contained citric acid as the additive at a concentration of 1.5% BOR plus N,N-dimethylethanolamine (DMEA) at a concentration of 1% BOR. All of the mixes also contained an additional 1.4% BOR of water. The results of this example are shown below.

| Hours Elapsed | Order of Viscosity Increase For the Various Mixes |
|---|---|
| 0.66 | 3>2>1 |
| 1-5 | 3>2>1 with 3>>1 Mix 3 barely moves after 3-5 hours. |
| 6 | Remixed after 6 hours and then 2>3>1. |
| 14 | 3 equal or slightly greater than 2>>1. |
| 24 | 2,3>>1 Mix 1 flows fairly easily. Remixed 1 and 3 which were easily remixable whereas Mix 2 is too taffy-like to mix. After remixing 2 is equal or slightly greater than 1>>3 with mix 3 showing good flow. |
| 26-33 | 2 equal or slightly greater than 1>>3. Mix 3 shows good flow whereas Mix 2 is not tack-free. |
| 39 | 2>1>>3. Mix 2 is just barely tack-free. |
| 72 | Mix 1 is still sticky, flowing very slowly. Mix 3 still shows moderate flow which after remixing becomes good flow. |
| 127 | Mix 1 is not tack-free and Mix 3 shows moderately good flow. |
| 144 | Mix 1 is tack-free and Mix 3 shows moderately good flow. |

| Hours Elapsed | Order of Viscosity Increase For the Various Mixes |
|---|---|
| 288 | Mix 3 flows before and after remixing. |
| 336 | Mix 3 still flows. |

The resin solution containing the retarder which was used to prepare Mix 3 remained clear and homogeneous for at least 13 days.

It can be seen from the results of Example 7 that p-toluenesulfonic acid is an accelerator whereas citric acid/DMEA shows early thixotropy but becomes a strong retarder. Use of the chemical equivalent of benzenesulfonic acid, naphthalenesulfonic acid or methanesulfonic acid in place of the p-toluenesulfonic acid will also show acceleration in hardening.

EXAMPLE 8

Effect of Accelerator Using Resole/Novolac Blend with High Purity Magnesia

Novolac A solution (65% solids with 25% furfuryl alcohol and 10% ethanol and a molecular weight of about 600 and having a viscosity of about 2170 cps at 25° C.) can be mixed 1:1 by weight with Resin D to give a viscosity of about 2520 cps at 25°. This composition is tested without an additive as Mix 1 and with 2% BOR of ammonium toluenesulfonate as Mix 2. These two Mixes are tested in accordance with the Qualitative Flow Procedure. Observation will show that the ammonium toluenesulfonate accelerated the room temperature hardening of the composition in relation to the composition which does not contain the ammonium toluenesulfonate.

EXAMPLE 9

Effect of Acceleration on Qualitative Flow when using Novolac

This example shows the effect of an accelerator using a novolac resin with Standard Grade deadburned magnesia but without a resole resin. A phenol formaldehyde novolac resin is dissolved as a 60% solids solution in ethylene glycol with about 3.5% water and a molecular weight of about 3000 and a viscosity of about 5,700 cps at 25° C. The procedure used in this example is the Qualitative Flow Procedure. The Standard Grade magnesia contained 2.5% of CaO. Mix 1 is the Control together with 0.6% of water BOR. Mix 2 contains 2% of ammonium sulfamate BOR. Observation will show that the ammonium sulfamate accelerates the room temperature hardening of the composition in relation to the composition which does not contain the accelerator.

EXAMPLE 10

Effect of Phenolsulfonic Acid on Resin B

Resin B (50g) was diluted with 1% water and then with very good mixing phenolsulfonic acid (1.0 g, 65% active having 1.3% actives (BOR) gradually added. The resulting pH was 4.92 and the viscosity (25° C.) was 2970 centistokes. No apparent increase in viscosity was observed after 3 days but a 14% increase was observed after 6 days.

It can be seen from Example 10 that the addition of 1.3% of phenolsulfonic acid to Resin B at pH of 4.92 does not lead to observable hardening (i.e. viscosity increase) of the resin after several days at 25° C. in the absence of the magnesia aggregate. In contrast to this, the similar formulation of Mix 2 in Example 6 which contained deadburned magnesia had solidified and was tackfree in 21 hours. Similar effects as those of this example are expected with the use of Resin C or Resin D in place of Resin B or with other accelerators in place of phenolsufonic acid, provided that the pH of the resin is above 4.0.

What is claimed is:

1. A method for accelerating the ambient temperature hardening of a mixture of a phenolic resin and magnesia aggregate wherein the mixture has a pH of at least 4.5 which comprises mixing:
   A. magnesia aggregate;
   B. a curable phenolic resin solution selected from the group consisting of a novolac and a mixture of a novolac and a resole having a viscosity of about 100 to 10,000 cps at 25° C., the quantity of said resin being sufficient to bind the aggregate on thermal curing of the resin; and
   C. an accelerator compound in an amount sufficient to accelerate the ambient temperature hardening of said mixture of phenolic resin and magnesia aggregate, said compound selected from the group consisting of: a compound which provides to the mixture acetate, adipate, 1,2,4-benzenetricarboxylate, formate, glycolate, lactate, nitrate, benzenesulfonate, naphthalenesulfonate, methanesulfonate, phenolsulfonate, succinate, sulfamate, 4-aminobenzenesulfonate or toluenesulfonate anions; and a mixture of said accelerator compounds.

2. The method of claim 1 wherein the aggregate is deadburned magnesia.

3. The method of claim 1 wherein the aggregate is hardburned magnesia.

4. The method of claim 1 wherein the resin is a novolac in an organic solvent.

5. The method of claim 1 wherein the anion is nitrate.

6. The method of claim 1 wherein the anion is phenolsulfonate.

7. The method of claim 1 wherein the anion is sulfamate.

8. The method of claim 1 wherein the anion is formate.

9. The method of claim 1 wherein the compound which provides the anion is an acid and the phenolic resin is the condensation product of phenol and formaldehyde.

10. The method of claim 1 wherein the compound is lactate.

11. The method of claim 1, wherein the compound is adipate.

12. The method of claim 1 wherein the phenolic resin is a solution of novolac in an organic solvent and the aggregate contains from about 1.5% to 4% of calcium oxide.

13. The method of claim 1 wherein the phenolic resin is a mixture containing from about 1 to 4 parts by weight of resole for each part of novolac.

14. The method of claim 1 wherein the mixture includes an additive selected from the group consisting of from about 5% to 35% of graphite based on the weight of aggregate, 1% to 5% by weight of a metal powder selected from the group consisting of aluminum, magnesium, and silicon based on the weight of aggregate, and mixtures of said additives.

15. The method of claim 2 wherein the mixture includes from about 5% to 25% by weight, based on the weight of the resin, of an ester functional hardening agent selected from the group consisting of a lactone, a carboxylic acid ester, a cyclic organic carbonate and mixtures thereof.

16. A binder-aggregate composition having a pH of at least 4.5 which comprises a wet mixture of:
   A. magnesia aggregate;
   B. a curable phenolic resin solution selected from the group consisting of a novolac, and a mixture of a novolac and a resole having a viscosity of about 100 to 10,000 cps at 25° C., the quantity of said resin being from about 3% to 15% by weight of the magnesia; and
   C. an accelerator compound in an amount sufficient to accelerate the ambient temperature hardening of said wet mixture, said compound selected from the group consisting of: a compound which provides to the mixture acetate, adipate, 1,2,4-benzenetricarboxylate, formate, glycolate, lactate, nitrate, benzenesulfonate, naphthalenesulfonate, methanesulfonate, phenolsulfonate, succinate, sulfamate, 4-aminobenzenesulfonate, or toluenesulfonate anions; and a mixture of said accelerator compounds.

17. The composition of claim 16 wherein the phenolic resin is a resole having a viscosity of 250 to 5,000 cps at 25° C. and wherein the resole contains from 3% to 15% by weight of water.

18. The composition of claim 16 wherein the phenolic resin is a solution of a novolac in an organic solvent.

19. The composition of claim 16 wherein the anion is nitrate in a quantity of 0.5% to 6% based on the weight of resin.

20. The composition of claim 16 wherein the anion is phenolsulfonate in a quantity of 0.5% to 6% based on the weight of resin.

* * * * *